(12) United States Patent
Weimer

(10) Patent No.: US 7,150,246 B1
(45) Date of Patent: Dec. 19, 2006

(54) PET RESTRAINT SYSTEM FOR A VEHICLE WINDOW

(76) Inventor: Leann M Weimer, 1277 Ritchie Highway #202, Arnold, MD (US) 21012

(*) Notice: Subject to any disclaimer, the term of this patent is extended or adjusted under 35 U.S.C. 154(b) by 0 days.

(21) Appl. No.: 11/162,877

(22) Filed: Sep. 27, 2005

(51) Int. Cl.
B60R 22/14 (2006.01)
E06B 7/00 (2006.01)

(52) U.S. Cl. .............................. 119/771; 160/105; 49/70
(58) Field of Classification Search ................ 119/771, 119/412, 413, 415; 40/591, 593, 219; 49/70; 160/113, 186, 105
See application file for complete search history.

(56) References Cited

U.S. PATENT DOCUMENTS

| | | | | |
|---|---|---|---|---|
| 2,722,978 A | * | 11/1955 | Frisk | 160/40 |
| 2,803,471 A | * | 8/1957 | Roth | 280/748 |
| 3,743,001 A | * | 7/1973 | Baxter et al. | 160/105 |
| 4,653,562 A | | 3/1987 | Moss | |
| 4,854,364 A | | 8/1989 | Junker | |
| 4,944,548 A | * | 7/1990 | Payne et al. | 296/97.8 |
| D371,759 S | | 7/1996 | Larsen | |
| 5,570,542 A | | 11/1996 | Cameron | |
| 5,829,388 A | | 11/1998 | Rosso | |
| 6,192,628 B1 | | 2/2001 | Pinheiro | |
| D473,838 S | | 4/2003 | Wang | |
| 2002/0162258 A1 | * | 11/2002 | Anderson et al. | 40/591 |
| 2004/0134626 A1 | * | 7/2004 | Murray et al. | 160/105 |

* cited by examiner

Primary Examiner—Son T. Nguyen
(74) Attorney, Agent, or Firm—Sturm & Fix LLP

(57) ABSTRACT

The present invention provides a pet restraint system for a vehicle window that allows the pet access to outside air while being restrained from exiting the vehicle. The pet restraint system includes a plurality of spaced elongated transparent plastic strips removably secured to the vehicle window. Each of the elongated strips has a first end disposed to be received in the upper slot of a vehicle window frame, and a second end that carries a suction cup that adheres to the upper portion of a partially lowered vehicle window. The strips extend across the open area of the window frame and are spaced from each other at a distance that prevents the pet from exiting the vehicle.

3 Claims, 1 Drawing Sheet

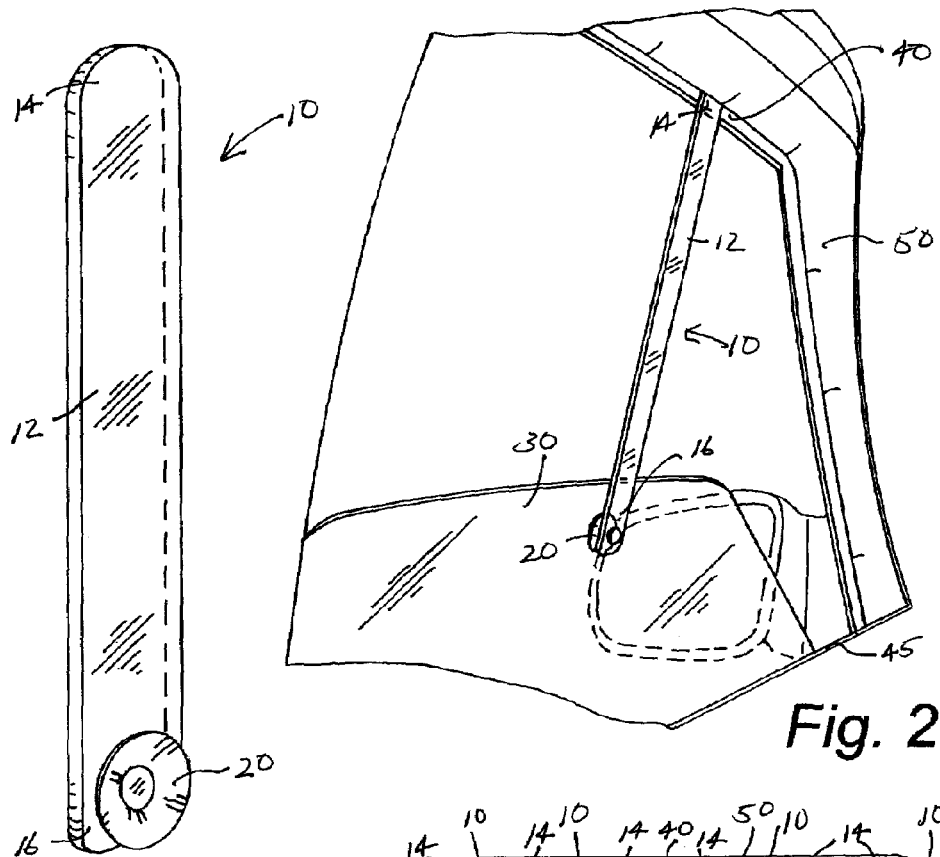
Fig. 1
Fig. 2
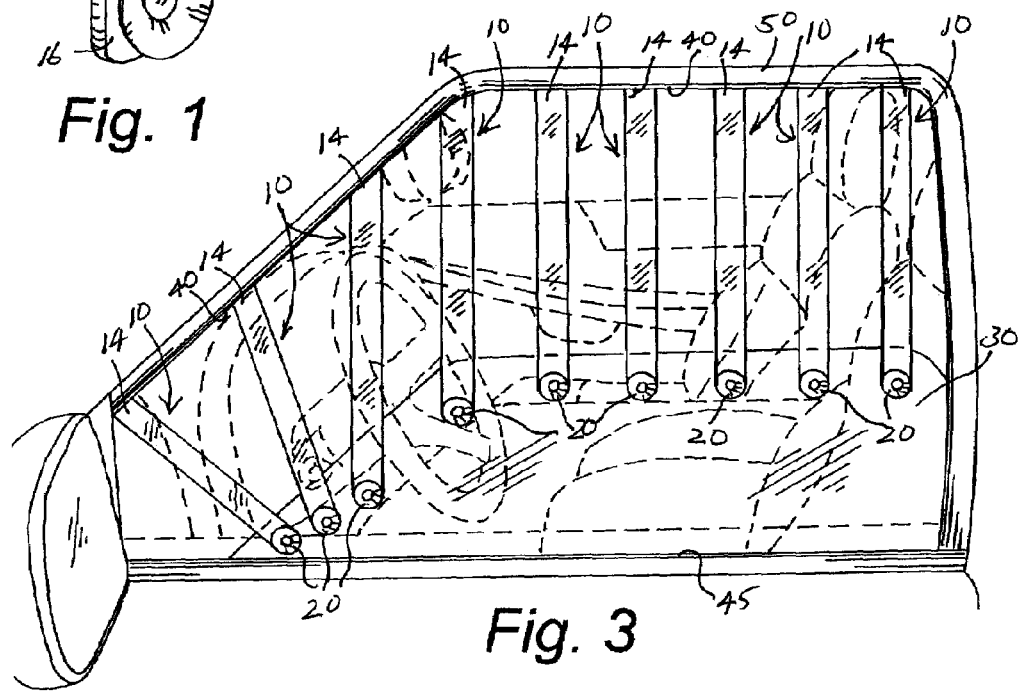
Fig. 3

PET RESTRAINT SYSTEM FOR A VEHICLE WINDOW

BACKGROUND OF THE INVENTION

The present invention relates to the field of pet restraint systems, and more particularly to a pet restraint system for use in conjunction with a vehicle window.

DESCRIPTION OF RELATED ART

As can be seen by reference to the following U.S. Pat. Nos., 4,653,562; 4,854,364; 5,570,542; 5,829,388; 6,192,628; Des.371,759; and Des.473,838, the prior art is replete with myriad and diverse pet restraint systems for vehicles.

While all of the aforementioned prior art constructions are more than adequate for the basic purpose and function for which they have been specifically designed, they are uniformly deficient with respect to their failure to provide a simple, efficient, and practical pet restraint system for a vehicle window.

As a consequence of the foregoing situation, there has existed a longstanding need for a new and improved pet restraint system for a vehicle window, and the provision of such a construction is a stated objective of the present invention.

BRIEF SUMMARY OF THE INVENTION

Briefly stated, the present invention provides a pet restraint system for a vehicle window that allows the pet access to outside air while being restrained from exiting the vehicle. The pet restraint system includes a plurality of spaced elongated transparent plastic strips removably secured to the vehicle window. Each of the elongated strips has a first end disposed to be received in the upper slot of a vehicle window frame, and a second end that carries a suction cup that adheres to the upper portion of a partially lowered vehicle window. The strips extend across the open area of the window frame and are spaced from each other at a distance that prevents the pet from exiting the vehicle.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of one of the transparent plastic strips used to configure the pet restraint system of the present invention;

FIG. 2 is a partial perspective view from the interior of a vehicle showing one of the strips attached and extending between the upper slot of the window frame and the upper portion of a partially lowered window; and FIG. 3 is a partial perspective view from the exterior of the vehicle showing a plurality of the strips secured in place and spaced to prevent the pet from exiting the vehicle.

DETAILED DESCRIPTION OF THE INVENTION

As can be seen by reference to the drawings, and in particular to FIG. 1, the plastic strips used to configure the pet restraint system that forms the basis of the present invention is designated generally by the reference number 10. Each strip 10 has an elongated body 12 with an upper end 14 and a lower end 16, and is formed of a transparent plastic material. The strips 10 may be made in a variety of suitable lengths to use on vehicles having differing window sizes. The lower end of each strip 10 carries a suction cup 20 for securing the lower end 16 to the upper portion of a partially lowered vehicle window 30 as illustrated in FIG. 2. The upper end 14 of the strip 10 is first positioned in the upper slot 40 of a vehicle window frame 50, then the moistened suction cup 20 is pressed against and secured to the interior side of the vehicle window 30.

FIG. 3 shows a plurality of strips 10 secured in spaced relationship across the opening of the partially lowered vehicle window 30. The spacing between the individual strips allows the pet access to outside air while preventing the pet from exiting the vehicle. It is to be understood that the spacing could be at smaller intervals for small pets, and larger intervals for larger pets. Also, it is understood that the window 30 may extend up from the lower window passageway 45 of the window frame 50 at various distances to be correctly positioned for strips 10 of any given length.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A pet restraint system for a vehicle window having a window frame with a lower window passageway and an upper slot disposed to receive an upper portion of a window when the window is in a closed position, the window being selectively movable with respect to the window frame to a partially lowered position where an upper portion of the window extends up from the lower window passageway, the pet restraint system comprising:
   a plurality of spaced strips, each strip having a first end disposed to be received in the upper slot of the vehicle window frame, and a second end;
   a suction cup attached to the second end of each strip and being disposed to engage and adhere to the upper portion at the window extending up from the lower window passageway when the window is in the partially lowered position;
   whereby the plurality of spaced strips allows a pet access to outside air while being restrained from exiting the vehicle when the window is in the partially lowered position.

2. The pet restraint system of claim 1 wherein the strips are formed of transparent material.

3. The pet restraint system of claim 2 wherein the material is plastic.

* * * * *